(No Model.)
T. W. MORAN.
UNIVERSAL JOINT FOR STEAM COUPLINGS.
No. 459,565. Patented Sept. 15, 1891.
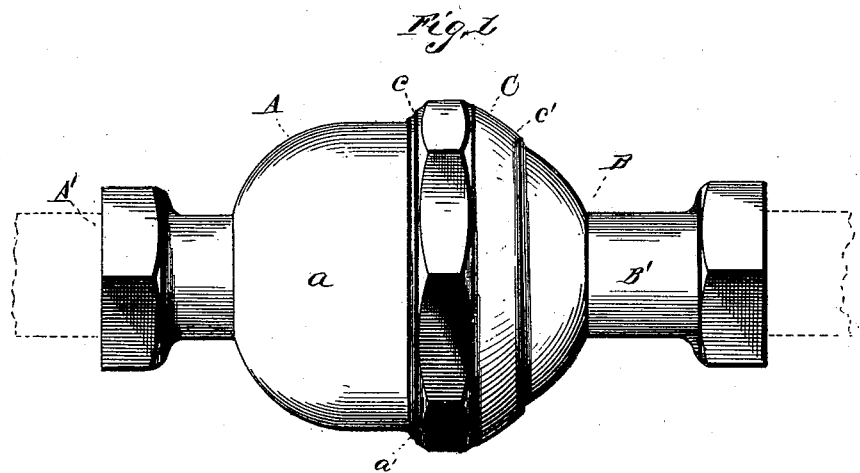
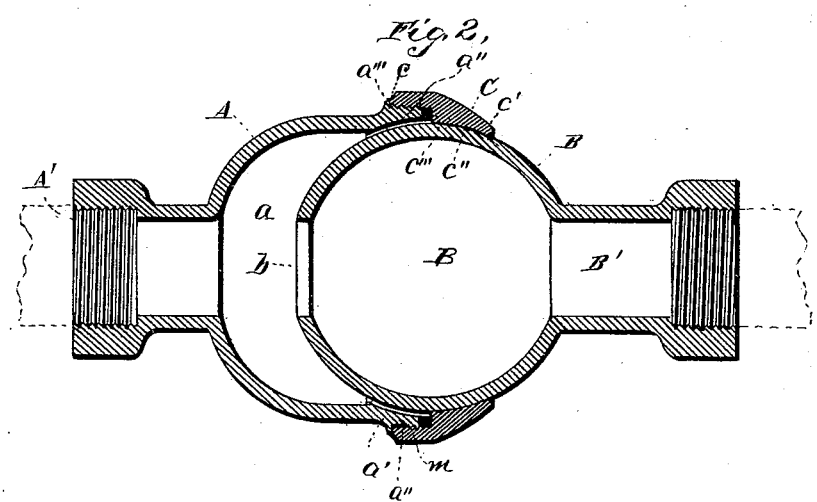
WITNESSES:
Chas. L. Taylor
Phill. Masi.
INVENTOR
Thomas W. Moran
BY
E. W. Anderson.
his ATTORNEY.

UNITED STATES PATENT OFFICE.

THOMAS W. MORAN, OF LOUISVILLE, KENTUCKY, ASSIGNOR TO THE MORAN FLEXIBLE STEAM JOINT COMPANY, OF SAME PLACE.

UNIVERSAL JOINT FOR STEAM-COUPLINGS.

SPECIFICATION forming part of Letters Patent No. 459,565, dated September 15, 1891.

Application filed February 24, 1890. Serial No. 341,526. (No model.)

*To all whom it may concern:*

Be it known that I, THOMAS W. MORAN, a citizen of the United States, and a resident of Louisville, in the county of Jefferson and State of Kentucky, have invented certain new and useful Improvements in Universal Joints for Steam-Couplings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of my invention, and Fig. 2 is a central longitudinal section.

This invention has relation to universal joints for steam-conveying pipes; and it consists in the novel construction and combination of parts, as hereinafter set forth.

The object of this invention is to provide a flexible hollow ball-joint wherever the bearing portions will have but a loose connection and will be comparatively without pressure of coaptation when steam is not applied, so that they will move upon each other without that grinding or cutting action which causes wear, but which, nevertheless, when steam is being carried will be automatically pressed against each other, so that the joints while flexible will be perfectly steam-tight.

This joint is designed for use especially in connection with the coupling-pipes of steam-brakes for railway-trains, as these pipes are not normally under steam-pressure, but when brought into action require that the joint shall be true and perfect, as upon its character it may happen that the safety of the train will depend.

In the accompanying drawings, the letter A designates the socket-section of the joint, B the ball-section, and C the annular coupling-bearing, and it is proper to state that, broadly, the employment of a socket-section, a ball-section, and an annular coupling-bearing is not new, as such parts have been used in forming close-fitting joints, which, on account of mechanical pressure, have a cutting or grinding action in the bearings, which soon renders them useless for the purpose of steam-brakes or steam-heating.

The socket-section A is formed with a deep or ellipsoidal chamber $a$, at the marginal portion of which is provided the annular spherically-beveled bearing $a'$, which is offset inward in order to provide steamway around that portion of the ball which extends into this chamber and which carries the steam-opening $b$. Around the exterior of the marginal portion of the socket-section is provided a thread, as at $a''$, which terminates at a circumferential stop-shoulder $a'''$, which is ground true and is designed to engage the circular edge $c$ of the ring coupling-bearing in a close and steam-tight manner when said coupling-bearing is screwed home.

$A'$ is the threaded opening of the socket-section, axially placed, and provided with a wrench-seat exteriorly in order that it may be readily connected with the piping.

The ball-section consists of the hollow sphere having the opening $b$ and the hollow neck $B'$, also threaded and provided with a wrench-seat for pipe connection.

The annular coupling-bearing C is provided exteriorly with a wrench-seat, and interiorly it has within its converging lip portion $c'$ the annular spherically-beveled bearing $c''$, which is at its inner margin offset interiorly, as at $c'''$. From the shoulder thus formed extends to the circular stop edge $c$ of the ring the interior thread $m$, which engages the thread $a''$ of the socket-section. The spherically-beveled bearings $a'$ and $c''$ are turned upon the same radius, while the stop edge $c$ of the ring coupling-bearing when screwed home is caused to bear against the stop-shoulder $a'''$ of the socket-section, whereby the bearing-surface $a'$ is held away from the ball-section when under pressure, and said ball-section is adapted when not under pressure to rest loosely between the spherically-beveled surfaces or bearings $a'$ $c''$ to permit the leakage of the water of condensation. The ball, therefore, which has its equatorial portion located between these bearings not only has entire freedom of movement when the joint is not carrying steam, but also is without any pressure except that due to the gravity of the parts against the annular coupling-bearing. In this condition there is therefore no grinding or cutting action between the parts to wear away the ball or bearing and destroy the steam-tight character of the joint. When steam is applied, the ball is automatically pressed up closely against the bearing $c''$ by the steam, and the joint at once becomes, although flexible, perfectly steam-tight.

Having described this invention, what I claim, and desire to secure by Letters Patent, is—

The self-adjusting flexible joint for steam-pipes, consisting of the hollow ball-section, the annular coupling-section having an inner spherically-beveled surface fitting said ball-section steam-tight, an internally-screw-threaded offset portion, and the socket-section offset inward, providing a steam space or way thereat and provided with an external screw-thread engaging said screw-threaded portion of said coupling-section, said socket-section also having a circular stop-shoulder engaging the outer edge of said offset portion of the coupling-section, substantially as set forth.

In testimony whereof I affix my signature in presence of two witnesses.

THOS. W. MORAN.

Witnesses:
PHILIP C. MASI,
C. L. TAYLOR.